US009260598B2

(12) United States Patent
Hayakawa et al.

(10) Patent No.: US 9,260,598 B2
(45) Date of Patent: Feb. 16, 2016

(54) FLUORORESIN AND POLYAMIDE FIBER COMPOSITION, AND SLIDING MEMBER MADE THEREFROM

(71) Applicant: DUPONT MITSUI FLUOROCHEMICALS CO LTD, Tokyo (JP)

(72) Inventors: Osamu Hayakawa, Shizuoka (JP); Noriyuki Suzuki, Shizuoka (JP)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 14/368,606

(22) PCT Filed: Dec. 26, 2012

(86) PCT No.: PCT/US2012/071625
§ 371 (c)(1),
(2) Date: Jun. 25, 2014

(87) PCT Pub. No.: WO2013/101811
PCT Pub. Date: Jul. 4, 2013

(65) Prior Publication Data

US 2014/0378615 A1 Dec. 25, 2014

(30) Foreign Application Priority Data

Dec. 28, 2011 (JP) ................................ 2011-288264

(51) Int. Cl.

| | |
|---|---|
| ***C08L 27/12*** | (2006.01) |
| ***C08L 77/06*** | (2006.01) |
| ***C08K 5/16*** | (2006.01) |
| ***C08L 29/10*** | (2006.01) |
| ***C08L 27/18*** | (2006.01) |
| ***F16C 33/20*** | (2006.01) |
| *C08K 7/02* | (2006.01) |

(52) U.S. Cl.
CPC ................ *C08L 29/10* (2013.01); *C08L 27/18* (2013.01); *F16C 33/201* (2013.01); *C08K 7/02* (2013.01)

(58) Field of Classification Search
CPC ......... C08L 77/00; C08L 77/02; C08L 77/04; C08L 77/06; C08L 77/08; C08L 77/10; C08L 77/12; C08L 2205/16
See application file for complete search history.

(56) References Cited

U.S. PATENT DOCUMENTS 5,767,186 A * 6/1998 Shimokusuzono et al. .. 524/502

FOREIGN PATENT DOCUMENTS

| | | | |
|---|---|---|---|
| JP | 58-176242 | A | 10/1983 |
| JP | 59-197456 | A | 11/1984 |
| JP | 2-163147 | A | 6/1990 |
| JP | 6-122877 | A | 5/1994 |
| JP | 2006-225433 | A | 8/2006 |
| JP | 2008-106086 | A | 5/2008 |
| WO | 98/57803 | A1 | 12/1998 |
| WO | 99/45285 | A1 | 9/1999 |

OTHER PUBLICATIONS

Alicja Van Der Heijden, Authorized Officer, PCT International Search Report and Written Opinion, Apr. 5, 2013.

* cited by examiner

*Primary Examiner* — Ana Woodward
(74) *Attorney, Agent, or Firm* — Keith W. Palmer

(57) ABSTRACT

Described herein are fluororesin compositions of melt processible fluororesin and wholly aromatic polyamide fibers. The wholly aromatic polyamide fibers have an average fiber diameter of 10-20 μm and an average fiber length of 100-1,000 μm. The compositions are melt processible and can be melt molded into sliding members having low wear when used with sliding counterparts made of metals such as aluminum, copper, zinc or nickel.

6 Claims, 2 Drawing Sheets

FLUORORESIN AND POLYAMIDE FIBER COMPOSITION, AND SLIDING MEMBER MADE THEREFROM

This application represents a national filing under 35 U.S.C. 371 of International Application No. PCT/US12/71625 filed Dec. 26, 2012, and claims priority of Japanese Application No. JP2011-288264 filed Dec. 28, 2011.

FIELD OF INVENTION

The present invention relates to a composition that is a mixture of melt processible fluororesin and wholly aromatic polyamide fibers of certain diameter and length. The composition is melt processible and can be melt molded into sliding members having a low wear rate.

BACKGROUND OF INVENTION

Polytetrafluoroethylene (alternately referred to herein as PTFE) has a low friction coefficient and excellent heat and chemical resistance. However, fillers often need to be used with PTFE to prepare a PTFE composition with adequate wear resistance or creep resistance for a given use. Fillers for PTFE known in the art include inorganic fillers such as glass fibers, carbon fibers, graphite, molybdenum disulfide, and bronze powder, and organic fillers such as aromatic polyester, polyimide, polyphenylene sulfide, and aromatic polyamides. PTFE molding powder and filler compositions are not melt processible but can be molded into sliding members or seal members of commercial utility by processes such as compression molding.

However, the number of commercial manufacturing processes for sliding members such as seal rings is large, and the commercial mass production of such sliding members from PTFE compositions is not easy due to the fact that PTFE is not melt processible. As a results, processes for the manufacture of PTFE sliding members often result in significant waste and accompanying undesirable costs.

In order to overcome such productivity problems, the literature reports attempts to mix the aforementioned fillers with melt processible fluororesins such as tetrafluoroethylene-perfluoroalkyl vinyl ether copolymer resin (alternately referred to herein as PFA), tetrafluoroethylene-hexafluoropropylene copolymer (alternately referred to herein as FEP), and tetrafluoroethylene-ethylene copolymer (alternately referred to herein as ETFE), each of which are melt processible and have excellent moldability, though their friction characteristic is inferior to that of PTFE, and make the moldability and the frictional wear characteristic compatible to obtain sliding members or seal members. For example, a composition in which graphite, polyphenylene sulfide or aromatic polyamide fibers, etc., are mixed into a melt processible fluororesin, which can be melt-processed by injection molding, etc., are proposed in the literature.

In addition, lightness, miniaturization and environmental measures have recently been advanced in various kinds of hydraulic apparatuses or sliding machines, increasing opportunities to use lightweight soft metals such as aluminum alloys.

In the case where the sliding counterpart member is a lightweight soft metal such as aluminum alloy, since the counterpart metallic material is apt to be worn and damaged by a sliding member or seal member molded of a conventional resin composition containing inorganic fillers, members to which organic fillers (particles or fibers) such as polyimide resin or wholly aromatic polyamide resin, which have high strength and are softer than inorganic fillers, are added have frequently been used. See for example such disclosures in: Japanese Kokai Patent Application No. Hei 2 [1990]-163147: Japanese Kokai Patent Application No. Hei 6 [1994]-122887; and Japanese Kokai Patent Application No. 2006-225433.

As mentioned above, to overcome the productivity problem due to the non-melt processibility of PTFE, attempts have been made to obtain sliding members or seal members from melt processible fluororesins such as PFA, FEP, or ETFE with excellent moldability, although the friction characteristic of these resins is inferior to that of PTFE. However, since the melt processible fluororesins such as PFA are inferior in friction characteristic compared with PTFE, use of a filler is essential. However, since the addition of the filler could also deteriorate the moldability of the melt processible fluororesin, it was difficult to develop a composition that raises the frictional wear characteristic while maintaining good moldability as an advantage of the melt processible fluororesins and meets performances required for sliding members. In addition, as fillers that do not damage the counterpart member, the utilization of organic fillers has recently been reviewed. However, thermoplastic resin fillers were melted during kneading with a fluororesin, and as a result being unable to exert an effect as fillers. Moreover, in case fibrous fillers were used, sufficient melt-mixing was impossible because of the entanglement of the additive fillers, causing segregation, thus being unable to exert a stable frictional wear characteristic.

SUMMARY OF INVENTION

The objective of the present invention is to provide a composition for a sliding member containing organic fibers, which can be molded by a thermal melt-molding method, especially injection molding, and has an excellent frictional wear characteristic. A further objective of the present invention is a seal member or sliding member made from this composition.

The present inventors reviewed the aforementioned problems and experimented in earnest to solve them. As a result, it was discovered that the aforementioned problems could be solved by adopting in melt processible fluororesin wholly aromatic polyamide fibers as a filler with a relatively long fiber length, which was added to the melt processible fluororesin, leading to the completion of the present invention.

The present invention provides a fluororesin composition, in which melt processible fluororesin powder is blended with wholly aromatic polyamide fibers with an average fiber diameter of 10-20 μm and an average fiber length of 10-1,000 μm, and the present invention provides a sliding member that is obtained from said composition by melt processing.

In one embodiment the present invention is a fluororesin composition in which the wholly aromatic polyamide fibers with an average fiber diameter of 10-20 μm and an average fiber length of 200-900 μm are mixed with the melt processible fluororesin. In one embodiment the present invention is a composition in which the average fiber length of the wholly aromatic polyamide fibers is 250-600 μm.

In one embodiment the present invention is a composition in which the wholly aromatic polyamide fibers are 5-25 wt % of the composition.

In one embodiment the present invention is a composition in which the wholly aromatic polyamide fibers are para-type wholly aromatic polyamide resin.

In one embodiment the present invention is a composition in which the wear factor to an aluminum alloy (ADC-12) based on JIS K 7218 (A method) is $20.0\times10^{-6}$ (cm$^3$·sec/ kg·m·hr) or smaller, in another embodiment the present invention is a composition in which the wear factor is 15.0×$10^{-6}$ or smaller, in another embodiment the present invention is a composition in which the wear factor is 10.0×$10^{-6}$ or smaller.

In one embodiment, the composition of the present invention is prepared through a process (I) for obtaining a powder mixture of melt processible fluororesin and wholly aromatic polyamide fibers and a process (II) for melt-mixing said powder mixture, In another embodiment, the aforementioned melt-mixing process includes a mixing process for applying a shear stress by using a melt-mixing extruder. In another embodiment, the melt processible fluororesin is aggregated powder with an average particle diameter of 10 μm or smaller in which colloidal particulates are aggregated. In another embodiment, the melt processible fluororesin fine powder and the wholly aromatic polyamide fibers are mixed by a biaxial rotary mixer.

In one embodiment of the present invention, the wholly aromatic polyamide fibers, which are included in the aforementioned molded sliding member, are dispersed in a scattered state of each fiber into the melt processible fluororesin as shown in the electron micrographs of FIGS. 1A, 1B, 2A and 2B.

The present inventors discovered that when aromatic polyamide fibers of a certain diameter and length were added to a melt processible fluororesin, the fibers and the resin were well entangled with each other to greatly improve the frictional wear characteristic. For example, the frictional wear characteristic was greatly improved, compared with the case where the same wholly aromatic polyamide particles were used as a filler. It was found that the moldability of the composition was not significantly negatively affected within the aforementioned fiber length range. Therefore, in the composition developed by these inventors, the friction wear characteristic as a weak point is strengthened while maintaining high moldability intrinsic to the melt processible fluororesin, and exerting high performance as a sliding member.

This discovery by these inventors is an unexpected result that has not been achieved in the prior art. With regard to the improvement of the frictional wear characteristic, for example, compositions containing a melt processible fluororesin and a wholly aromatic polyamide (and other components) are presented in the aforementioned Japanese patent references. However, in any of these references, the difference due to the shape of the wholly aromatic polyamide is not recognized. In other words, the particle shape and the fiber shape are not discriminated. In addition, with regard to the maintenance of the moldability, as a general theory, it is considered in the literature that the larger an added filler (i.e., the longer the filler fibers), the poorer the moldability of the composition. However, it has been discovered that the wholly aromatic polyamide fibers, which are used in the present invention, are different from other fibers and even if relatively long fibers are used, the moldability of the composition is little affected in the aforementioned range, showing a unique nature.

Moreover, the composition of the present invention is excellent in terms of high frictional wear characteristic, even if fillers other than the wholly aromatic polyamide fibers are absent.

BRIEF DESCRIPTION OF THE DRAWINGS

Embodiments are illustrated in the accompanying figures to improve understanding of concepts presented herein.

FIG. 1A is a view in the MD direction, meaning machine direction, which is in line with the direction of resin flow during molding. FIG. 1B is a view in the TD direction, meaning transverse direction, which is a direction perpendicular to the direction of resin flow during molding.

FIG. 2A is a view in the MD direction, and FIG. 2A is a view in the TD direction.

DETAILED DESCRIPTION OF INVENTION

Figure 1A:
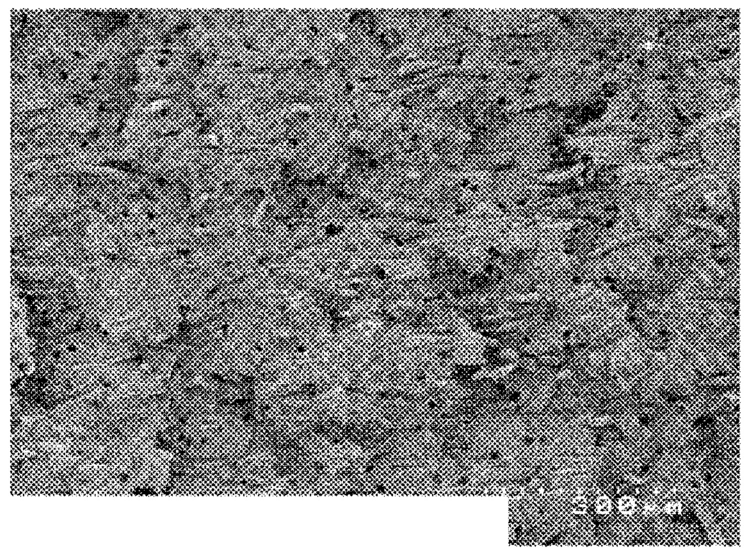
FIGS. 1A and 1B are photomicrographs of a melt-mixed composition of PFA resin and wholly aromatic polyamide fibers with average fiber diameter of 12 μm and average fiber length of 250 μm.

In the present invention, "melt processible fluororesin" means a fluororesin that can flow in the molten state and can be molded into products such as films, fibers, and tubes from a molten state by using conventional well-known melt molding machines such as an extruder or injection molding machine, where the molded products can exhibit sufficient strength and durability (toughness) for their desired use.

Melt processible fluororesins of the present invention include, for example, polymers or copolymers of monomers, which are selected from tetrafluoroethylene, chlorotrifluoroethylene, hexafluoropropylene, perfluoro(alkylvinyl ether), vinylidene fluoride, and vinyl fluoride, or copolymers of these fluorinated monomers and non-fluorinated monomers such as ethylene, propylene, butene, pentene, hexane, or copolymers of these fluorinated monomers and non-fluorinated monomers having a triple bond such as acetylene and propyne.

Example melt processible fluororesins of the present invention include tetrafluoroethylene-perfluoro(alkylvinyl ether) copolymer (PFA), tetrafluoroethylene-hexafluoropropylene copolymer (FEP), tetrafluoroethylene-hexafluoropropylene-perfluoro(alkylvinyl ether) copolymer, tetrafluoroethylene-ethylene copolymer (ETFE), polyvinylidene fluoride (PVDF), polychlorotrifluoroethylene (PCTFE) and chlorotrifluoroethylene ethylene copolymer (ECTFE). However, the present invention is not limited to these fluororesins. In one embodiment, the alkyl group of the perfluoro(alkylvinyl ether) of the tetrafluoroethylene-perfluoro(alkylvinyl ether) copolymer is 1-5. In another embodiment, the alkyl group of the perfluoro(alkylvinyl ether) of the tetrafluoroethylene-perfluoro(alkylvinyl ether) copolymer is 1-3.

Such fluororesins are commercially available. For example, PFA resins are commercially available under the trade names of Teflon (registered trademark) PFA (DuPont-Mitsui Fluorochemicals Co., Ltd.), Neoflon (registered trademark) PFA (Daikin Industries, Ltd.), and Fluon (registered trademark) PFA (Asahi Glass Co., Ltd.).

In these melt processible fluororesins, although there is no particular limitation on the melt viscosity or molecular weight, in case the melt processible fluororesin is molded by injection molding, the melt viscosity of the melt processible fluororesin is preferably 10-60 g/10 min in melt index (by ASTM D1238, measured at 372° C. and a load of 5 kg).

As the melt processible fluororesin, polymer particles are preferable in terms of mixture efficiency; however, the melt processible fluororesin is changed to a powder or pellet shape by a desired method including a pulverization method that will be mentioned later. The melt processible fluororesin with any shape that can be prepared to a powder mixture with the wholly aromatic polyamide fibers may be adopted.

As the fluororesin powder that is used in this melt processible resin composition, aggregated powder with an average particle diameter of 10 μm or smaller, preferably 7 μm or smaller, and further preferably 5 μm or smaller in which colloidal particles with an average particle diameter of about 0.2 μm is more preferably used. This aggregated powder, for example, can be obtained by adding an electrolytic substance to an aqueous dispersion of melt processible fluororesin, which is obtained by emulsion-polymerizing about 1-75 wt % colloidal particles of a melt processible fluororesin with an average particle diameter of about 0.1-0.3 μm into water, aggregating colloidal particles of the melt processible fluororesin while mechanically stirring, separating them from the aqueous medium, washing with water as needed, and drying.

In the present invention, the average particle diameter (d50) of the melt processible fluororesin powder is the particle diameter of particulates measured by using a particle diameter measurer (name of device: Microtrac X100 manufactured by Leeds & Northrup Co,) based on a laser diffraction method after dispersing the particulates into water. d50 indicates the diameter at which the amount of large side and small side are equal, when the powder is divided into two by a certain particle diameter, meaning an average particle diameter of the measuring sample.

"Wholly aromatic polyamide fibers" in the present invention means synthetic fibers that are prepared from a polymer in which an aromatic monomer is polymerized through an amide bond, and these fibers are also called "aramid fibers" in the corresponding field. Since the wholly aromatic polyamide fibers have excellent physical and chemical properties, these fibers are industrially very useful. "Fibers" in the present invention are fibers in which these high-strength fibers are cut short and are used mainly as a reinforcing material by mixing with resins, concrete, rubbers, etc.

The wholly aromatic polyamide fibers, which are used in the present invention, can be distinctly discriminated from conventional particle-shaped wholly aromatic polyamide, that is, wholly aromatic polyamide "particles." The wholly aromatic polyamide fibers of the present invention, as mentioned above, are short fibers cut into a prescribed length and maintain the fiber structure. On the contrary, the wholly aromatic polyamide particles, for example, are obtained by pulverizing short fibers cut into a certain degree of size or a polymer bulk by using a well-known pulverizer such as bead mill or jet mill. Or a wholly aromatic polyamide polymer solution is introduced into an aqueous solidifying solution and solidified while stirring and shearing to obtain a fibrid-shaped, pulp-shaped, and fibrous amorphous aqueous molded product, and this molded product is frozen with liquid nitrogen, etc., without passing it through a drying process and finely pulverized by utilizing the expansion of water (e.g., see Japanese Kokai Patent Application No. 2008-106086, paragraph [0016]). Therefore, the wholly aromatic polyamide "particles" do not maintain the fiber structure.

The wholly aromatic polyamide fibers are not particularly limited as long as it contains an aromatic ring in the main chain; however, a para-type wholly aromatic polyamide is preferably used in terms of heat resistance or frictional wear characteristic, "Para-type wholly aromatic polyamide" in the present invention means that the part in charge of the connection with monomer units before and after each monomer unit constituting the wholly aromatic polyamide exists at a para position. As the para-type wholly aromatic polyamide, for example, polyparaphenylene terephthalamide, copolyparaphenylene-3,4'-oxydiphenylene terephthalamide, etc., are of utility. A meta type wholly aromatic polyamide is mentioned as other aromatic polyamides of utility in the present invention. "Meta-type wholly aromatic polyamide" in the present invention means that the connection in charge of the connection with monomer units before and after each monomer unit constituting the wholly aromatic polyamide exists at a meta position.

There are the following products available on the market as the aromatic polyamide. For example, as the para-type wholly aromatic polyamide, there are TWARON (registered trademark) and TECHNORA (registered trademark) (manufactured by Teijin Technoproducts K.K.) and Kevlar (registered trademark) (manufactured by DuPont-Toray Co., Ltd.) are mentioned. In addition, as the meta type wholly aromatic polyamide, there are CONEX (registered trademark) (manufactured by Tejin Ltd.) and NOMEX (registered trademark) (manufactured by DuPont-Toray Co., Ltd.).

The wholly aromatic polyamide fibers, which are used in the present invention, have an average fiber diameter of 10-20 μm, preferably 12-17 μm, for example, 12-13, 13-14, 14-15, 15-16, or 16-17 μm, and an average fiber length of 100-1,000 μm, preferably 200-900 μm, more preferably 200-800 μm, and further preferably 250-600 μm, for example, 250-300, 300-350, 350-400, 400-450, 450-500, 500-550, and 550-600 μm.

For the wholly aromatic polyamide fibers in the present invention, the fibers to be used are optionally drawn out and magnified by a microscope to measure the fiber length and the fiber diameter of 50 pieces of fibers, and their average values determined.

The wholly aromatic polyamide fibers suitable for the present invention are prepared by forming a wholly aromatic polyamide resin with excellent high strength, high elastic modulus, size stability, heat resistance at 400° C. or higher, chemical resistance, etc., into fibers, and after forming said polyamide resin into fibers by solution-spinning, these fibers are cut and pulverized into short fibers. Its shape is an acicular shape and a fibrous shape; however, the fibers usually have a shape in which several pieces of fibers are fused in the aforementioned preparation processes. It is characterized that the wholly aromatic polyamide fibers are softer than inorganic fillers, though their strength is high.

In addition, the wholly aromatic polyamide fibers of utility have a para-type structure, with the average fiber diameter being preferably 10-20 μm.

If the fiber diameter is finer than 10 μm, the frictional wear characteristic as the wholly aromatic polyamide fibers cannot be exerted, whereas if the fiber diameter is thicker than 20 μm, the dispersibility into the fluororesin is inferior, attaining a similar inferior frictional wear characteristic.

Independent wholly aromatic polyamide fibers with an average fiber length of 100-1,000 μm are preferable. If the average fiber length is shorter than 100 μm, the frictional wear characteristic cannot be exerted, whereas if the average fiber diameter is longer than 1,000 μm, the dispersibility into the fluororesin is deficient, which is unacceptable for a sliding member. The average fiber length is preferably 200-900 μm, more preferably 250-600 μm.

The mixture ratio of the aforementioned wholly aromatic polyamide fibers into the fluororesin is preferably 5-25 wt %, more preferably 7-20 wt %, and further preferably 10-18 wt %, based on the combined weight of melt processible fluororesin and wholly aromatic polyamide fibers. If the amount of wholly aromatic polyamide fibers in the fluororesin composition is less than 5 wt %, the mixture effect cannot be obtained, whereas if the amount is more than 25 wt %, the wholly aromatic polyamide fibers cannot be sufficiently mixed with the fluororesin, unacceptably resulting in a molded product that easily cracks.

A melt processible fluororesin mixed composition of the present invention can be formed from the melt processible fluororesin and the wholly aromatic polyamide fibers by melt mixing.

The melt processible fluororesin composition of the present invention, for example, can be obtained through a melt-mixing process. More specifically, the melt processible fluororesin composition of the present invention can be obtained through a process of (I) obtaining a melt processible fluororesin powder mixture by dry-mixing fine melt processible fluororesin powder and wholly aromatic polyamide fibers and (II) melt-mixing said obtained powder mixture by extruder, etc.

In one embodiment, the melt processible fluororesin composition of the present invention is prepared by mixing fine melt processible fluororesin powder with an average particle diameter of 10 μm or smaller and wholly aromatic polyamide fibers with an average fiber diameter of 10-20 μm and an average fiber length of 100-1,000 μm in advance to obtain a melt processible fluororesin powder mixture, in which the wholly aromatic polyamide fibers are uniformly dispersed in advance into the fine melt processible fluororesin powder, and charging said obtaining powder mixture into a melt-mixing extruder and melt-mixing the powder mixture. In this manner, the wholly aromatic polyamide fibers can be more uniformly dispersed into the melt processible fluororesin by a shear stress, thus being able to separate the fibers fused during the preparation of the wholly aromatic polyamide fibers and hence obtaining independent fibers distributed throughout the fluororesin.

The melt processible fluororesin powder mixture composed of the melt processible fluororesin powder and the wholly aromatic polyamide fibers is preferably further melt-mixed to attain a uniform melt processible fluororesin composition. This melt-mixing is preferably carried out by applying a shear stress using a melt-mixing extruder. In this case, to reduce binding in a hopper of the melt-mixing extruder, these components may also be melt-mixed by the melt-mixing extruder after compacting them by a compactor.

As the melt-mixing extruder that is employed in the melt-mixing process, a high-speed biaxial extruder, for example, biaxial extruder 2D30W2 made by Toyo Seiki Co., Ltd., is preferably employed in terms of shear stress to more effectively disperse the wholly aromatic polyamide fibers throughout the fine melt processible fluororesin powder.

In the method that mixes melt processible fluororesin powder with an average particle diameter of 10 μm or smaller and wholly aromatic polyamide fibers with an average fiber diameter of 10-20 μm an average fiber length of 100-1,000 μm in advance by a high-speed rotary mixer and melt-mixes the mixture by a melt-mixing extruder, since the melt processible fluororesin powder and the wholly aromatic polyamide fibers are uniformly mixed in advance by the high-speed rotary mixer, the melt-mixing time in the melt-mixing extruder can be shortened. In the melt-mixing extruder, the fused fibers are mostly unraveled. Therefore, of the melt processible fluororesins, especially in case a resin such as PFA with a high melt molding temperature is used, the decomposition of the wholly aromatic polyamide fibers can be prevented by shortening the melt-mixing time.

As one of the advantages of the present invention, other fillers are not required to be added to the melt processible fluororesin composition. However, if necessary, other such inorganic or organic powder or fibers with an average particle diameter of 200 μm or smaller, which are generally of utility as fillers for fluororesin compositions, can also be mixed in an amount that does not effect the purpose of the present invention. For example, glass fillers (for example, glass fibers or glass beads), hydrophilic fillers such as alumina powder, calcium sulfate, calcium carbonate, or bronze powder, semi-hydrophilic fillers such as potassium titanate fibers, talc, zinc oxide powder, carbon fibers, molybdenum disulfide, and graphite powder, organic fillers such as polyimide, polyamide, polyphenylene sulfide, and polyether ether ketone, etc., can be used. Products on the market can be used as long as they are fillers with the aforementioned average particle diameter and/or the aforementioned average fiber length.

In addition, in the present invention, stabilizers or additives such as oxidation stabilizer, heat-resistant stabilizer, weather-resistant stabilizer, flame retardant, and pigment can be mixed in the range where the desirable characteristics of the sliding member or seal member of the present invention are not damaged.

The method for melt molding the melt processible fluororesin composition of the present invention into molded products (sliding members or seal members) with various kinds of shapes is not particularly limited, and various kinds of intended molded products can be molded by well-known methods for melt molding melt processible fluororesin compositions. However, the characteristics of the molded products can be obtained especially by an injection molding method.

Since the resin composition of the present invention can be melted, it can be applied to melt-molding that requires to melt the composition, for example, injection molding, extrusion molding, and the like. The melting temperature during molding may be appropriately set in accordance with the specific fluororesin. However, melt molding temperatures for the present compositions of 340-400° C., especially 350-380° C., are generally appropriate.

The sliding member of the present invention is used so that it is slid relatively to a counterpart member. For example, it can be used in bearings, seal rings, piston rings and the like. If the sliding member of the present invention is used in the aforementioned usages, then the coefficient of dynamic friction of the surface is effectively reduced in said sliding member, the sliding member is little worn even in the absence of lubrication, and the wear of the counterpart member can also be effectively prevented.

The sliding member of the present invention is preferably used where the counterpart member is made of a metal, and especially, the usage in which the counterpart member is made of a soft metal. In case the counterpart member is made of a metal, since the slightly worn metal acts as an abrasive, the wear of the sliding member and the counterpart member tends to be distinct. Especially, the wear of the counterpart member made of a soft metal is more distinct. However, in the present invention, the wear prevention effect can be more effectively exerted even in these cases.

Examples of the constituent metal of the counterpart member include aluminum, stainless steel, iron, copper, zinc, nickel, and the like, and alloys thereof. Of these metals, the sliding member of the present invention exhibits a preferable effect, especially on soft metals that are easily worn, for example, aluminum, copper zinc, and nickel. Among them, the sliding member has superior performance with aluminum.

EXAMPLES

Application Examples

The present invention will be explained in further detail by application examples and comparative examples. However, the present invention is not intended to be limited by these examples.

Preparation of Manufacture Example 1

Wholly aromatic polyamide fibers with an average fiber diameter of 12 μm and an average fiber length of 100 μm were mixed with raw material PFA powder at a ratio of the aramid fibers at 10 parts by weight to the PFA powder at 90 parts by weight, charged into a henschel mixer, and mixed at the number of rotation of 3,400 rpm for 10 min. The powder mixture obtained was melt-mixed at 350° C. and 50 rpm for 3 minutes by using a batch type melt mixer (KF-70 manufactured by Tokyo Seiki Co., Ltd.) to obtain a composite composition. The composite composition obtained was cut by a pelletizer so that a pellet was obtained.

Preparation of Manufacture Example 2

An intended pellet was obtained by a method similar to that of Manufacture Example 1 except for mixing wholly aromatic polyamide fibers with an average fiber diameter of 12 μm and an average fiber length of 1,000 μm at 10 parts by weight with PFA powder at 90 parts by weight.

Preparation of Manufacture Example 3

An intended pellet was obtained by a method similar to that of Manufacture Example 1 except for mixing wholly aromatic polyamide fibers with an average fiber diameter of 12 μm and an average fiber length of 250 μm at 10 parts by weight with PFA powder at 90 parts by weight.

Preparation of Manufacture Example 4

An intended pellet was obtained by a method similar to that of Manufacture Example 1 except for mixing wholly aromatic polyamide fibers with an average fiber diameter of 12 μm and an average fiber length of 600 μm at 10 parts by weight with PFA powder at 90 parts by weight.

Preparation of Manufacture Example 5

An intended pellet was obtained by a method similar to that of Manufacture Example 1 except for mixing wholly aromatic polyamide fibers with an average fiber diameter of 17 μm and an average fiber length of 600 μm at 10 parts by weight with PFA powder at 90 parts by weight.

Preparation of Comparative Example 1

An intended pellet was obtained by a method similar to that of Manufacture Example 1 except for mixing the wholly aromatic polyamide powder with an average particle diameter of 25 μm at 10 parts by weight with PFA powder at 90 parts by weight.

Preparation of Comparative Example 2

An intended pellet was obtained by a method similar to that of Manufacture Example 1 except for not adding a filler to PFA powder.

Preparation of Comparative Example 3

An intended pellet was obtained by a method similar to that of Manufacture Example 1 except for mixing carbon fibers (fiber length: 110 μm) at 5 parts by weight and graphite at 2 parts by weight with PFA powder at 93 parts by weight.

Preparation of Comparative Example 4

Carbon fibers (110 μm) at 10 parts by weight were mixed with PTFE powder at 90 parts by weight and uniformly mixed by using a henschel mixer, so that a powder mixture was obtained.

Preparation of Comparative Example 5

Wholly aromatic polyamide particles with an average particle diameter of 25 μm were added to modified PTFE, and a powder mixture was obtained by a method similar to that of Comparative Example 4.

Application Example 1

Frictional Wear Test

The pellets of Manufacture Examples 1-5 and Comparative Examples 1-3 prepared by the aforementioned methods were put into a prescribed mold (size: Ø35 mm, 150 mm), held at 350° C. for 3.5 hours to melt the resins, and cooled at room temperature while maintaining the compression at a pressure of 3.5 MPa for 1 hour, so that columnar molded parts with a diameter of 35 mm and a height of 43 mm were obtained. For the PTFE of Comparative Examples 4 and 5, the powder mixtures were, respectively, preliminarily molded under pressurization at 600 kg/cm$^2$ and 300 kg/cm$^2$, baked at 370° C. for 3 hours, so that columnar molded parts having 50 mm in diameter and 100 mm in height were obtained. From these columnar molded parts, rings with an outer diameter of 25.7 mm, an inner diameter of 20 mm, and a height of 20 mm were prepared by cutting and adopted as specimens. According to JIS K 7218 (A method) (JIS Handbook 26, plastic I test, 2005, Japanese Standards Association), using a two-stage-type frictional wear tester (made by Intesco K.K.), ADC-12 as an aluminum alloy was selected a counterpart member, and the amount of wear was measured by a sliding test for 24 hours under the conditions of a load of 8.0 kg/cm$^2$ and a sliding speed of 0.5 m/sec. After finishing the test, the amount of wear was indicated by wear factor and friction coefficients. The results are shown in the following Table 1.

TABLE 1

| | PFA Amount added | Para-type wholly aromatic polyamide: Fibers: Diameter (μm) | Fiber length 100 μm | Fiber length 250 μm | Fiber length 600 μm | Fiber length 1000 μm | Powder Diameter 25 μm | Other fillers | Frictional wear result: Wear factor × $10^{-6}$ $\frac{cm^3 \cdot sec}{kg \cdot m \cdot hr}$ | Frictional wear result: Coefficient of dynamic friction |
|---|---|---|---|---|---|---|---|---|---|---|
| Manufacture Example 1 | 90 | 12 | 10 | | | | | | 21.8 | 0.303-0.335 |
| Manufacture Example 2 | 90 | 12 | | | | 10 | | | 31.1 | 0.258-0.301 |
| Manufacture Example 3 | 90 | 12 | | 10 | | | | | 6 | 0.248-0.333 |
| Manufacture Example 4 | 90 | 12 | | | 10 | | | | 5.6 | 0.286-0.321 |
| Manufacture Example 5 | 90 | 17 | | | 10 | | | | 14.7 | 0.261-0.292 |
| Comparative Example 1 | 90 | | | | | | 10 | | 56.7 | 0.267-0.304 |
| Comparative Example 2 | 100 | — | | | | | — | — | 5,000 | — |
| Comparative Example 3 | 93 | | | | | | | Carbon fibers 5 Graphite 2 | 270 | — |
| Comparative Example 4 | 90 (PTFE) | | | | | | | Carbon fibers 10 | 39 | — |
| Comparative Example 5 | 90 (Modified PTFE) | | | | | | 10 | | 12.1 | 0.169 |

As shown in Table 1, in the wholly aromatic polyamide fibers (Manufacture Examples 1-5), the frictional wear characteristic of the PFA resin was largely improved, compared with the wholly aromatic polyamide particles (Comparative Example 1). From these results, it was clarified that as the fillers of the compositions for sliding members having a melt processible fluororesin base, the fibrous fillers were more appropriate than the particle-shaped fillers. Especially in the case of wholly aromatic polyamide fibers with a fiber length of 250 μm and 600 μm (Manufacture Examples 3, 4, and 5), improved frictional wear characteristics were obtained, and these values were higher than those of the compositions (Comparative Examples 4 and 5) having a PTFE base as well as the example (Comparative Example 1) using the wholly aromatic polyamide particles.

Application Example 2

Reciprocating Wear Test (I Type)

In order to further investigate the performance of the compositions of Manufacture Examples 3 and 4, a wear loss weight test in MD direction, CD direction, and thickness direction of injection-molded specimens was carried out under the conditions of a wear ring H-22, a load of 1,000 g, a stroke of 30 mm, a speed of reciprocation 60 times/min, a reciprocation cycle of 4,000 times, a temperature of 23±2° C., and a humidity of 50±5 RH by a reciprocating wear tester TYPE 30S (manufactured by Shinto Kagaku K.K.). The results are shown in the Table 2. Here, the MD direction means a direction (machine direction) vertical to a resin flow during molding, the CD direction means a horizontal direction (cross machine direction), and the TD direction means a thickness direction (transverse direction).

TABLE 2

| | MD direction (mg) | CD direction (mg) | TD direction (mg) |
|---|---|---|---|
| Manufacture Example 3 | 47.6 | 45.7 | 67.9 |
| Manufacture Example 4 | 36.8 | 37.7 | 50.2 |

In any of these compositions, it was confirmed that an improved frictional wear characteristic was exerted in all directions as well as the injection direction. Surprisingly, the composition of Manufacture Example 4, in which the polyamide fibers with length 600 μm, exhibited an improved frictional wear characteristic in all directions.

Application Example 3

Measurement of Melt Flow Rate (MFR)

Using a melt indexer manufactured by Toyo Seiki Co., Ltd., provided with a corrosion-resistant cylinder, die, and piston based on ASTM D-1238-95, 5 g sample was filled in the cylinder with an inner diameter of 9.53 mm, held at 372±1° C. for 5 minutes and extruded through an orifice with an inner diameter of 2.1 mm and a length of 8 mm under a load of 5 kg (piston and weight). The extrusion rate (g/10 min) at that time was attained as MFR. It was confirmed that the compositions of Manufacture Examples 1-5 exhibited MFR of 11.2-21.1 g/10 min and high moldability was maintained, even after the addition of the wholly aromatic polyamide fibers.

Application Example 4

Microscope Test

Figure 1B:
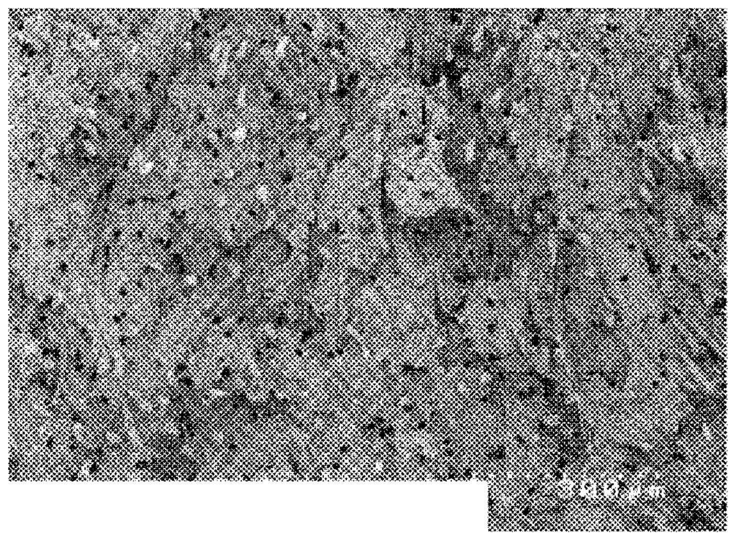
Figure 2A:
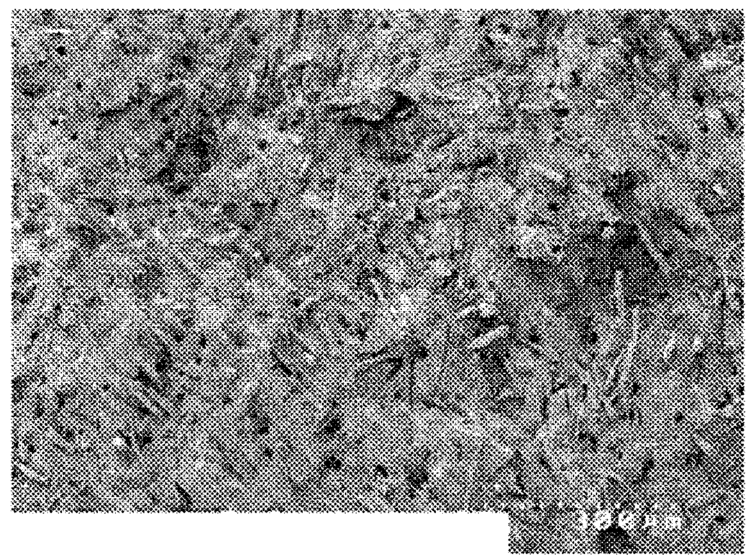
FIGS. 2A and 2B are photomicrographs of a melt-mixed and injection molded composition of PFA resin and wholly aromatic polyamide fibers with average fiber diameter of 12 μm and average fiber length of 600 μm.
Figure 2B:
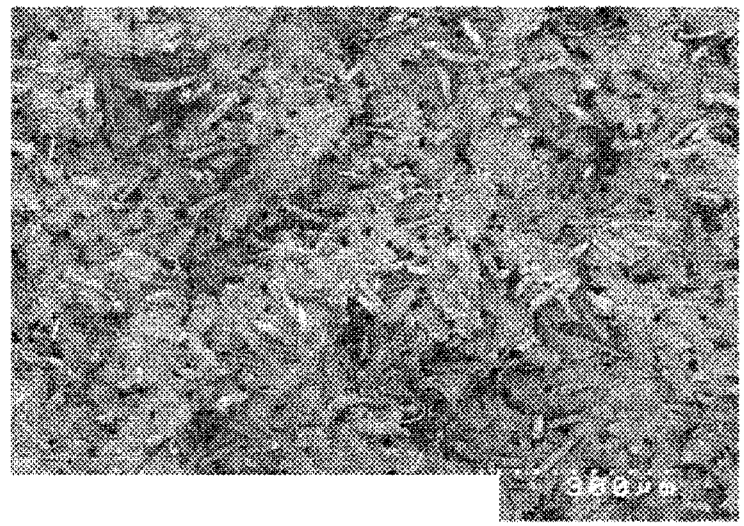

The compositions of Manufacture Examples 3 and 4 were injection-molded, and the specimens obtained were cut into each direction and observed by electron micrographs of FIGS. 1A, 1B, 2A and 2B showing dispersed states of the fibers.

From any of these figures, it is understood that the added fibers are not bundles but are in each independent fiber state and these fibers are uniformly dispersed into the fluororesin. In addition, in Manufacture Example 4 in which the fiber length is long, the fiber direction is more random, exerting a filling effect.

In the melt processible fluororesin composition that is provided by the present invention, since the wholly aromatic polyamide fibers among organic fillers, which have lower hardness and are softer than inorganic fillers, are effectively dispersed as a filler into the melt processible fluororesin, the counterpart member made of a lightweight soft metal such as aluminum is difficult to be worn and damaged, and this composition has an excellent wear resistance characteristic such as small self-wear, thus being able to be applied to various kinds of sliding members.

In addition, since the melt processible fluororesin composition, which is provided by the present invention, can be molded by a thermal melt-molding method, especially an injection molding method, this composition can be molded into complicated shapes. Hydraulic seal rings, piston rings, seal rings for gas compressors, high-temperature and high-pressure seal members, mechanical seals, gaskets and the like are examples of final molded products possible by the present fluororesin composition.

The invention claimed is:

1. A fluororesin composition consisting of melt processible fluororesin and wholly aromatic polyamide fibers, wherein the amount of said wholly aromatic polyamide fibers is from 5 to 25 weight percent, based on the combined weight of said melt processible fluororesin and said wholly aromatic polyamide fibers, and wherein said wholly aromatic polyamide fibers have an average fiber diameter of from 10 μm to 20 μm and an average fiber length of from 100 μm to 1,000 μm.

2. The composition of claim 1, wherein the average fiber length of said wholly aromatic polyamide fibers is from 200 μm to 900 μm.

3. The composition of claim 1, wherein the average fiber length of said wholly aromatic polyamide fibers is from 250 μm to 600 μm.

4. The composition of claim 1, wherein said wholly aromatic polyamide fibers comprise para-type wholly aromatic polyamide resin.

5. A sliding member obtained by melt-molding the composition of claim 1.

6. The sliding member of claim 5, having a metal sliding counterpart, wherein said metal comprises aluminum, copper, zinc or nickel.

* * * * *